United States Patent [19]
Schaller

[11] 3,727,350
[45] Apr. 17, 1973

[54] CONTOUR GRINDER
[75] Inventor: Robert L. Schaller, Camillus, N.Y.
[73] Assignee: Sundstrand-Engelberg, Inc.
[22] Filed: Nov. 16, 1971
[21] Appl. No.: 199,257

[52] U.S. Cl. ................................ 51/141, 51/165.88
[51] Int. Cl. ................................................ B24b 2/12
[58] Field of Search ................ 51/135, 135 BT, 141, 51/148, 165.87, 165.88

[56] References Cited
UNITED STATES PATENTS

| | | | |
|---|---|---|---|
| 2,733,555 | 2/1956 | Dugle et al. | 51/135 BT |
| 3,491,488 | 1/1970 | Schaller et al. | 51/135 R |
| 3,555,742 | 1/1971 | Stewart et al. | 51/165.87 |
| 3,594,957 | 7/1971 | Goldberg et al. | 51/165.88 |

*Primary Examiner*—Donald G. Kelly
*Assistant Examiner*—Howard N. Goldberg
*Attorney*—Hofgren, Wegner, Allen, Stellman & McCord

[57] ABSTRACT

A contour grinding apparatus including an endless belt grinding member trained about a drive roller and an expansible cylindrical guide, the latter of which directs the grinding member past a work station, together with a device for sensing the thickness of the grinding member to detect wear, and a device responsive to the sensing device for expanding the guide to compensate for wear of the grinding member and thereby maintain a constant radius of the work contacting surface of the grinding member at the grinding station. In one form of the invention, the guide is a rotatable contact roller, and in another form the guide is a stationary cylindrical platen.

17 Claims, 6 Drawing Figures

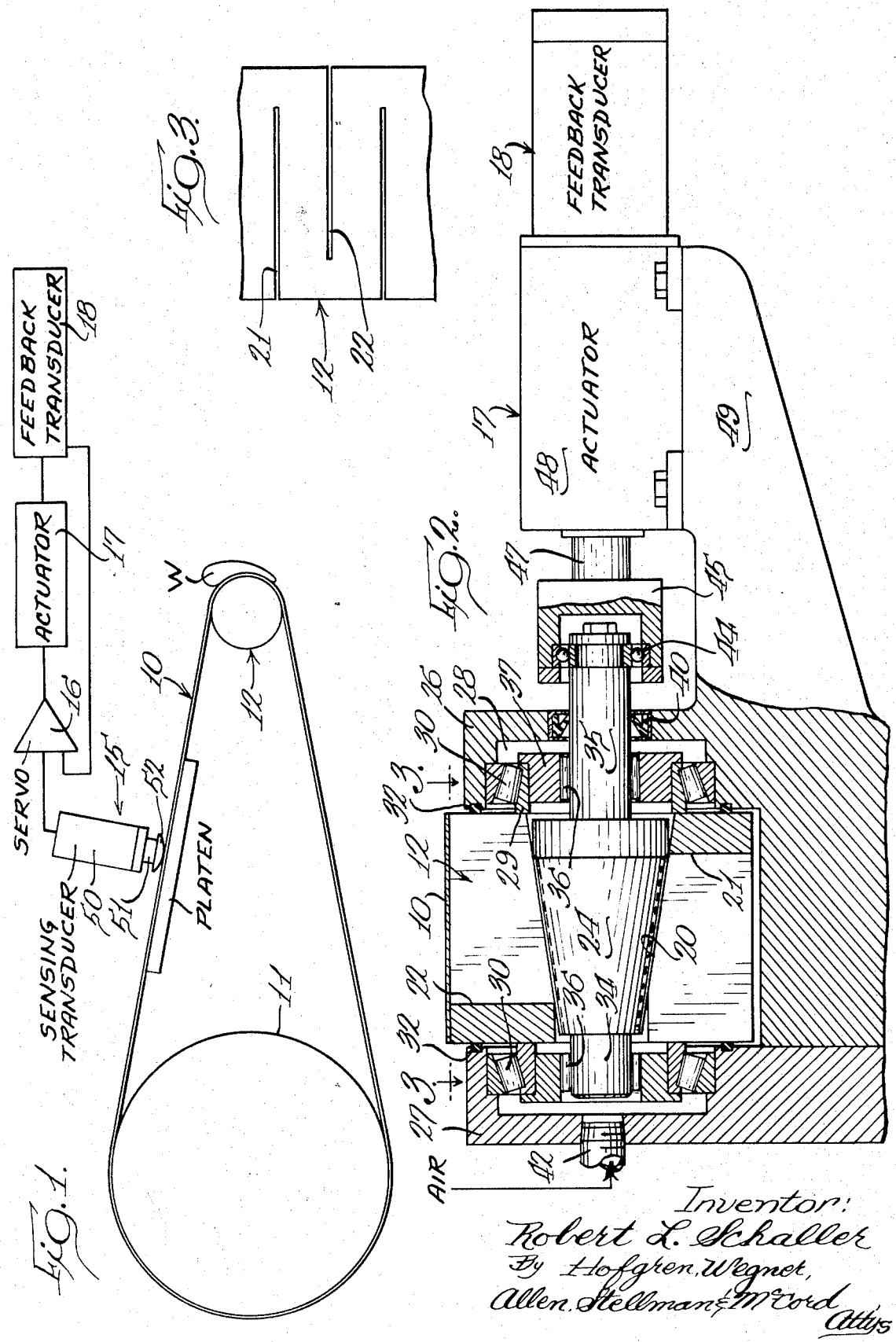

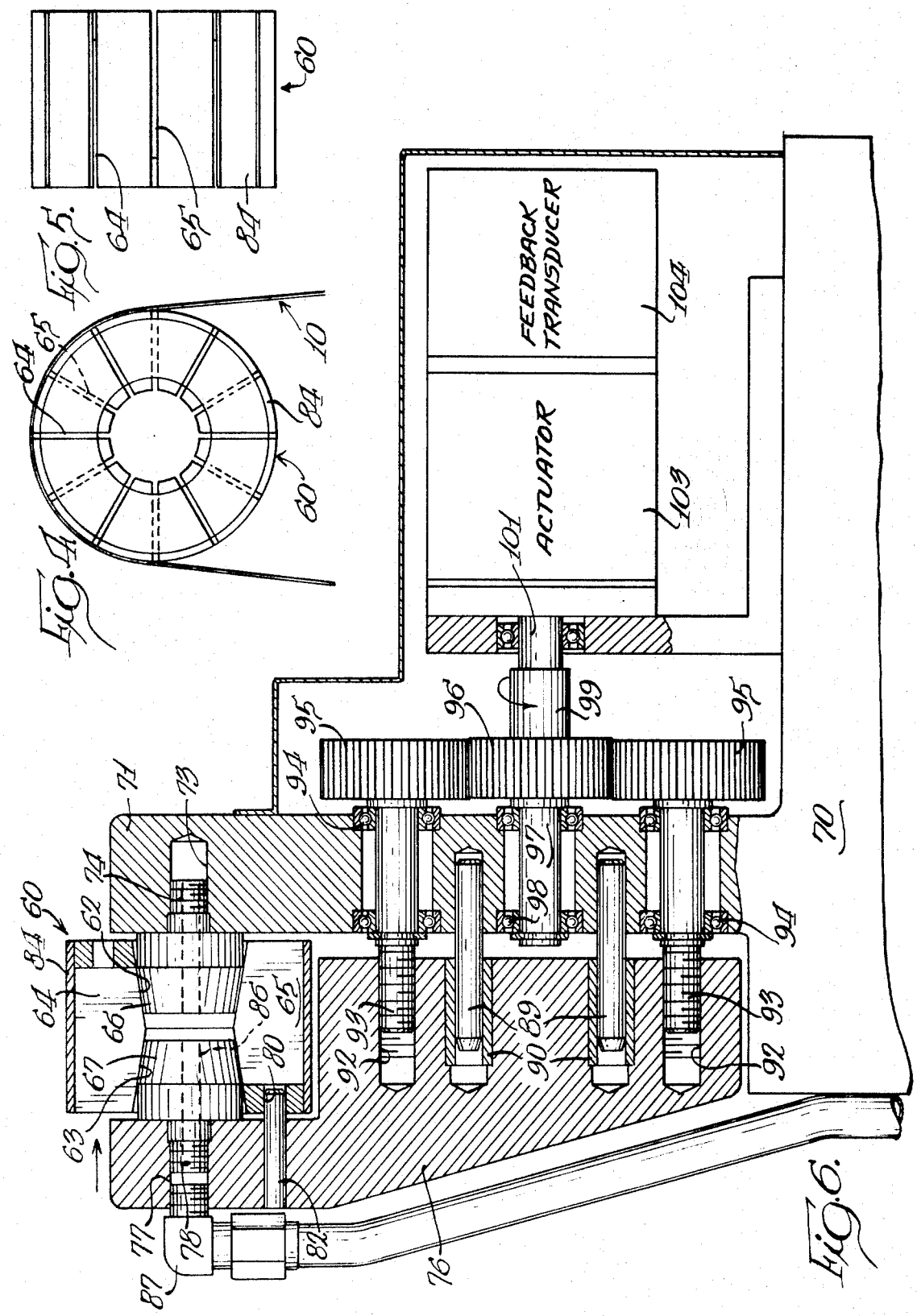

CONTOUR GRINDER

BACKGROUND OF THE INVENTION

The present invention relates to grinding apparatus, and particularly to apparatus for grinding contour surfaces such as the concave surface of a gas turbine compressor blade. Such blades require accurate finishing to precise dimensions in order to produce the desired functions. At the same time, it is inevitable that grinding elements will suffer wear after extended use. Thus, where the contoured surface of the work is to conform to the configuration of the grinding element, any variation in the configuration of the grinding element due to wear will result in a variation of the work from the desired configuration. This is particularly true where the grinding element comprises an endless belt passing about a cylindrical guide of relatively small diameter because a limited change in the radius of the guide in such circumstances represents a significant difference in the curvature of the guide, and hence the curvature of the work, in contrast to very limited differences in radius of a relatively large guide where the difference in curvature would be less distinct. Accordingly, there is a significant need for a contour grinding apparatus in which provision is made for adjustment of the radius of a guide to compensate for wear in the grinding element.

SUMMARY OF THE INVENTION

According to the present invention, a contour grinding apparatus includes a drive roller and a spaced cylindrical guide supporting an endless belt grinding element in an arrangement where the guide is of relatively small radius for purposes of finishing the contoured concave surface of a gas turbine compressor blade. In order to compensate for wear of the endless belt grinding member, the guide is constructed to be expansible, and means is provided for sensing variation in the thickness of the grinding member to adjust the radius of the guide to compensate for the variation.

More specifically, the invention includes an actuator for expanding the guide, a servo device for starting the actuator responsive to a signal from the sensing means indicating the occurrence of objectionable wear, and a feedback device responsive to movement of the actuator for supplying a signal to the servo for stopping the actuator after completion of an adjustment corresponding to that called for by the sensing means.

The guide comprises a hollow cylindrical member having alternate slots extending longitudinally from opposite ends of the member, each partially toward the other end, a conical interior surface in the hollow guide member, and a conical plunger in contact with the conical surface for movement axially to expand the segments of the guide between the slots while the guide retains a substantially cylindrical outer surface.

In one embodiment of the invention, the cylindrical guide for the grinding belt adjacent the work comprises a rotatable contact roller. In another embodiment particularly suited for contour of very small radius, the cylindrical guide is a non rotatable cylindrical platen.

BRIEF DESCRIPTION OF THE DRAWINGS

FIG. 1 is a diagrammatic illustration of a grinding apparatus embodying the principles of the present invention;

FIG. 2 is a partly sectional view illustrating the construction of an expansible cylindrical guide in the form of a contact roller in association with an acutator for expanding the roller;

FIG. 3 is a fragmentary plan view of the expansible contact roller;

FIG. 4 is an elevational view showing a cylindrical guide in the form of a non rotatable platen adapted for use in an apparatus as illustrated in FIG. 1;

FIG. 5 is a fragmentary plan view of the platen of FIG. 4; and

FIG. 6 is a sectional view illustrating the construction of an expansible non rotatable platen in association with actuating means for expanding the platen.

DESCRIPTION OF THE PREFERRED EMBODIMENT

Referring now to the drawings in more detail, and particularly FIG. 1, endless belt grinding member 10 passes about a drive roller 11 of relatively large diameter so that the latter guides the grinding member past a work station where a workpiece as at W is positioned for finishing. As illustrated, the workpiece W is a gas turbine compressor blade positioned to have its inner concave surface precision-finished with a curvature at a predetermined radius which exceeds the radius of the contact roller 12 by a slight amount corresponding to the thickness of the endless belt grinding member 10. It will be understood that if the thickness of the grinding element 10 decreases significantly because of wear, the radius of the work surface of the belt passing about the contact roller 12 is reduced, and the radius of the finished surface on the workpiece is altered. The drive roller 11 may be driven by any suitable means, and as illustrated herein, the contact roller 12 is an idler roller.

In order to compensate for wear of the endless belt grinding member 10, which results in reducing the thickness of the member, provision is made for sensing the thickness to detect wear for purposes of making an appropriate compensation. Toward this end, the upper reach of the endless belt grinding member 10 passes over a platen which provides a flat surface for backing the grinding member adjacent a sensing device 15. The sensing device 15 is adapted to function in a manner to detect variations in thickness of the belt 10, and in such event to provide a signal to a servo device 16 arranged to initiate operation of an actuator 17 for expanding the contact roller 12. Operation of the actuator 17 drives a feedback transducer 18 which supplies a feedback signal to the servo for neutralizing the sensing signal to terminate operation of the actuator after adjustment of the contact roller in an amount to compensate for the wear.

Referring now to FIGS. 2 and 3, the contact roller 12 comprises a generally cylindrical body having a substantially cylindrical outer surface and a central axially extending aperture defined by a conical surface 20. In order to provide for expansion of the roller, it is formed of a suitable metal material, such as spring steel, adapted to flex and provided with a plurality of slots as at 21 and 22 which extend radially through the roller from the outer cylindrical surface to the inner conical surface 20. Alternate slots 21 and 22 begin at opposite ends of the roller and extend axially toward the other end of the roller for a major part of the length of the roller, but terminate short of the end of the roller in order to leave expansible segments between the slots which allow the roller to be expanded to increase the radius while enabling retention of a substantially cylindrical outer surface. The inner conical surface 20 of the roller receives a conically shaped plunger as at 24 adapted to be moved axially of the surface 20 for the purpose of forcing the roller segments between the slots radially outwardly.

For purposes of adequately protecting the roller and its operating parts, it is mounted in a housing as at 26 including a cover member 27. The housing and the cover member together provide a chamber as at 28 in which a substantial portion of the roller is housed, leaving a projecting portion for supporting the grinding member 10. In the chamber 28, axial extensions 29 on the roller 12 provide for rotary support of the roller in tapered bearings as at 30, supported by the housing 26 and the cover 27. Access to the chamber 28 housing the bearings is restricted by means of sealing members as at 32 in the housing 26 and the cover 27, engaging opposite ends of the roller 12.

The conical plunger 24 in the roller 12 is supported by a shaft having opposite ends as at 34 and 35 slidably supported in roller bearings as at 36 carried in outer races 37 supported by roller extensions 29. The shaft end 35 extends outwardly of the housing 26 and a shaft seal 40 may be provided where the shaft passes through the housing wall.

If desired, the chamber 28 containing the bearings for supporting roller 12 may be pressurized for purposes of excluding contaminants by admitting air under pressure through a fitting 42 which may also be utilized, if desired, for supplying lubrication such as oil mist.

In order to provide for axial movement of the cone member 24 to expand the contact roller 12, the outer end of shaft 35 is mounted in a rotary thrust bearing as at 44 carried in a cup 45 fixed on the end of an axially adjustable shaft 47 extending from the housing 48 of actuator 17. The actuator 17 is supported on an arm 49 extending from the roller housing 26, and the actuator housing 48 encloses a driving means such as a rotary electric motor (not shown) driving a threaded coupling adapted to produce linear motion of the shaft 47 on rotation of the motor.

The actuator is controlled by servo 16 which may be of conventional construction adapted to initiate operation of the electric motor in the actuator on receipt of an electrical signal from the sensing transducer 15, compare the signal from the sensing transducer with that from the feedback transducer and maintain operation of the actuator until such time as the feedback signal cancels the sensing signal, indicating an adjustment of the contact roller 12 corresponding to that called for by the sensing transducer in order to compensate for wear.

The sensing transducer 15 may be similar to that shown and described in my prior application for U.S. Letters Patent Ser. No. 91,636 filed Nov. 23, 1970. In general, the transducer is an electromechanical device which produces an electrical output signal proportional to the linear displacement of a movable core relative to one or more surrounding coils. As shown in FIG. 1, a housing 50 has a reciprocable sensing member 51 which functions as a magnetic core movable relative to one or more coils (not shown) in the housing 50. The sensing member 51 includes a hardened carbide pad as at 52 in contact with the grinding member 10. In operation, the sensing member 51 is initially pre-set so that the transducer provides no output signal when the grinding member has the proper thickness to produce the desired work. Any movement of the sensing member due to variation in the thickness of the grinding member produces an output signal from the transducer to the servo causing operation of the actuator 17. Actuators of the type described have been developed to a high degree of perfection and are capable of accurately positioning the expander cone 24 within a 10,000th of an inch (0.0001 inch).

The feedback transducer 18 may comprise a linear variable differential transformer for producing an electrical output signal proportional to longitudinal displacement of the shaft 47 in order to neutralize the sensing signal to the servo when the desired adjustment has been attained. In general, such transformers include a longitudinally movable magnetic core or plunger arranged centrally in a series of coils in a manner to produce an electrical signal when the core is moved axially. Alternatively, if desired, the feedback transducer may comprise a rotary rheostat of the type described in U.S. Pat. 3,555,742, responsive to rotation of the electric motor which adjusts the cone member 24. In either event, the feedback transducer provides a signal to neutralize the sensing signal when appropriate adjustment has occurred.

FIGS. 4, 5 and 6 illustrate a second embodiment of the invention in which a stationary cylindrical platen 60 is utilized in lieu of the rotatable contact roller 12 in the embodiment of FIGS. 1, 2 and 3. The stationary cylindrical platen 60 is constructed along the lines of the rotatable contact roller 12 and is particularly suited for installation where the work contour has a very small radius. It should be understood that while FIGS. 4, 5 and 6 do not include an illustration of the entire system as illustrated in FIG. 1, it is contemplated that the cylindrical guide platen 60 in FIGS. 4, 5 and 6 will be used in a system similar to that illustrated in FIG. 1 including means for sensing wear in the grinding belt 10 and compensating for the wear by adjusting the diameter of the guide 60.

The guide platen 60 comprises a generally cylindrical body having a substantially cylindrical outer configuration as seen in FIG. 4 and having a central axially extending aperture defined by a pair of conical surfaces 62 and 63 extending from opposite ends of the guide member toward a reduced diameter at the middle of the member. In order to provide for expansion of the guide, it is formed with a plurality of slots as at 64 and 65 which extend radially through the member from the outer cylindrical surface to the inner conical surfaces 62 and 63. Alternate slots 64 and 65 begin at opposite ends of the member and extend axially toward the other end of the member for a major part of the length of the member, but terminate short of the end of the member in order to leave expansible segments between the slots which allow the member to be expanded to increase the radius while enabling retention of a substantially cylindrical outer surface. In order to expand the member, the inner conical surfaces 62 and 63 receive conically shaped plungers 66 and 67. The plunger 66 is stationary, while the plunger 67 is adapted to be moved axially of the surface 63 for the purpose of forcing the roller segments between the slots radially outwardly.

For purposes of supporting the guide member 60 and the means for adjusting such member, a base 70 is formed with an upright column 71 having a threaded aperture 73 adapted to receive a threaded extension 74 projecting from the conical plunger 60. The projection 74 is threaded into the aperture 73 so that the conical plunger 66 is stationarily mounted on the upright 71. In order to support the conical plunger 67, an adjustable support 76 is mounted on the upright 71 and formed with a threaded aperture 77 for receiving a threaded extension 78 on the conical plunger 67. The extension 78 is threaded into the recess 77 so that the conical plunger 67 is stationarily mounted on the support 76.

In order to retain the guide member 60 against rotation, it is formed with one or more eccentric end apertures as at 80, and a dowel pin as at 82 is provided on the support 76 for projection into the aperture 80 so that the guide is stationarily mounted. In order to facilitate sliding motion of the grinding belt 10 as it passes around the stationary cylindrical guide 60, the latter is formed with a hardened highly polished surface which reduces friction as much as possible. Toward this end, the cylindrical guide member is formed with polished carbide steel surfacing segments as at 84, positioned on the periphery of the member between the slots 64 and 65. As in the case of the contact roller 12, the guide member 60 may be made of appropriate metal material, adapted to flex, and the surfacing segments 84 may be suitably attached as by welding.

Preferably, each of the conical plungers 66 and 67 is formed with a central longitudinal passage as at 86, and a fitting may be provided at 87 for supplying air under pressure to the interior of the guide 60 through passage 86 of excluding contaminants. The air under pressure may also be utilized for supplying lubrication such as oil mist to facilitate adjustment when required.

In order to provide for adjustment of the conical plunger 67 relative to the conical plunger 66, the support 76 is mounted on the upright frame member 71 in a manner to permit movement of the support 76 toward and away from the upright 71. Toward this end, the upright 71 is provided with fixed dowel pins as at 89, and the dowel pins project into bushings 90 provided on the support member 76 so that the bushings are slidable on the dowel pins and the support member 76 is movable toward and away from the upright 71. In order to adjust the member 76 relative to the member 71, the member 76 is formed with threaded bores as at 92, each receiving a threaded shaft 93 rotatably mounted on the upright 71 so that on rotation of the shafts 93 the threaded connection produces motion of the support 76.

The threaded shafts 93 are mounted in bearings as at 94 on the upright 71, and each shaft includes a gear 95 fixed thereon and meshing with a drive gear 96 carried on a shaft 97 rotatably mounted in bearings 98 on the upright 71. The shaft 97 includes an extension 99 adapted to be coupled to a drive shaft 101 projecting from a rotary actuator 103 controlled by a feedback transducer 104.

The actuator 103, like that in the embodiment of FIGS. 1–3, may comprise a rotary electric motor adapted to rotate the shaft 101. The feedback transducer 104 may comprise a rotary rheostat of the type previously referred to in U.S. Pat. No. 3,555,742, responsive to rotation of the electric motor in the actuator 103.

In operation, it is contemplated that the structure illustrated in FIGS. 4, 5 and 6 would be utilized in an apparatus like that illustrated in FIG. 1, including a sensing transducer 15 for detecting wear in the grinding belt 10, and initiating adjustment through the medium of a servo device as at 16 for compensating for the wear in order to maintain the outer surface of the platen member 60 at a substantially constant raduis. The servo device initiates operation of the actuator as at 103 so that rotation of the drive shaft 101 has the effect of rotating the threaded shafts 93 to adjust the conical plunger 67 toward the conical plunger 66, thus increasing the radius of the guide member 60. The feedback transducer 104 senses operation of the actuator 103 for producing an output signal proportional to the compensating adjustment in order to neutralize the sensing signal in the servo device when the desired adjustment has been attained.

I claim:

1. A grinding apparatus, comprising,
    a. an endless belt grinding member,
    b. an expansible cylindrical guide positioned for directing the grinding member past a work station,
    c. means for sensing variation in the thickness of the grinding member, and
    d. means responsive to the sensing means upon detection of variation in thickness for adjusting the radius of the guide to compensate for the variation.

2. A grinding apparatus as defined in claim 1, including means providing a feedback signal responsive to the adjusting means for neutralizing the latter on adjustment equal to that called for by the sensing means.

3. A grinding apparatus as defined in claim 1, wherein the expansible guide comprises a hollow cylindrical member having alternate slots extending longitudinally from opposite ends of the member each partially toward the other end, and means inside the member for expanding the segments between the slots.

4. A grinding apparatus as defined in claim 1, wherein the guide has a conical internal surface, and a conical expanding member is movable axially of the conical surface for expanding the guide.

5. A grinding apparatus as defined in claim 1, including means mounting the guide for rotation.

6. A grinding apparatus as defined in claim 1, including means restraining the guide against rotation.

7. A contour grinding apparatus, comprising,
    a. an endless belt grinding member,
    b. an expansible cylindrical guide positioned for guiding the grinding member past a work station,
    c. a drive roller spaced from the cylindrical guide for supporting the grinding member with spaced reaches extending between the roller and the guide,
    d. a platen between the roller and the guide for backing one of the reaches, e. a sensing device adjacent the platen for detecting the thickness of the grinding member to determine wear, and f. means responsive to the sensing device for expanding the guide to compensate for wear, thereby to maintain a constant radius of the work surface of the grinding member at the work station.

8. A contour grinding apparatus as defined in claim 7, including means mounting the guide for rotation.

9. A contour grinding apparatus as defined in claim 7, including means restraining the guide against rotation.

10. A contour grinding apparatus as defined in claim 7, including an actuator for expanding the guide responsive to a signal from the sensing means, and a feedback device responsive to the actuator for supplying a signal to stop the actuator after adjustment called for by the sensing device.

11. A contour grinding apparatus as defined in claim 10, including a servo device for comparing signals from the sensing device and the feedback device and controlling the actuator.

12. A contour grinding apparatus as defined in claim 7, wherein the expansible guide comprises a hollow member having a substantially cylindrical outer surface and longitudinal slots alternately extending from opposite ends of the member each partially toward the other end so that the member may be expanded while retaining a substantially cylindrical outer surface.

13. A contour grinding apparatus as defined in claim 12, including a conical interior surface in the hollow guide member and a conical plunger in contact with the conical surface and movable axially for expanding the segments between the slots.

14. A contour grinding apparatus as defined in claim 13, including an actuator for moving the conical plunger axially, a servo device for starting the actuator responsive to a signal from the sensing means, and a feedback device responsive to movement of the actuator for supplying a signal to the servo for stopping the actuator after adjustment called for by the sensing means.

15. A contour grinding apparatus as defined in claim 13, including means mounting the hollow guide member for rotation, and means mounting the plunger for rotation.

16. A contour grinding apparatus as defined in claim 13, including a conical interior surface in the hollow guide member at each end thereof, a conical plunger in contact with each conical surface, and means mounting at least one plunger for movement axially for expanding the guide.

17. A contour grinding apparatus as defined in claim 16, including means restraining the guide member from rotation.

* * * * *